United States Patent
Fischer et al.

(10) Patent No.: US 6,480,910 B1
(45) Date of Patent: Nov. 12, 2002

(54) DIGITAL INTERFACE UNIT WITH SELECTIVE INPUT REGISTERS PROVIDING CONTROL VALUES TO OUTPUT REGISTERS THAT SIMULTANEOUSLY OUTPUT THE CONTROL VALUES WHEN ACTIVATED BY CONTROL LINE

(75) Inventors: Werner Fischer, Heimsheim (DE); Peter Grosshans, Hochdorf/enz (DE); Mathias Kugel, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/346,596

(22) Filed: Jul. 2, 1999

(30) Foreign Application Priority Data

Jul. 9, 1998 (DE) .......................... 198 30 625

(51) Int. Cl.[7] ............................. G06F 3/00; G06F 13/00
(52) U.S. Cl. .................................. 710/52; 710/8; 710/9
(58) Field of Search ................... 710/8, 9, 52

(56) References Cited

U.S. PATENT DOCUMENTS

| | | | |
|---|---|---|---|
| 3,728,684 A | | 4/1973 | Morganti ..................... 710/68 |
| 4,048,625 A | | 9/1977 | Harris, Jr. et al. ......... 358/1.16 |
| 5,014,185 A | * | 5/1991 | Saito et al. ................. 364/188 |
| 5,353,685 A | * | 10/1994 | Snow .......................... 91/459 |
| 5,515,278 A | * | 5/1996 | Niggemann et al. .......... 701/82 |
| 5,740,468 A | * | 4/1998 | Hirose ......................... 710/57 |
| 6,049,031 A | * | 4/2000 | Caulkins ....................... 84/50 |

FOREIGN PATENT DOCUMENTS

| | | |
|---|---|---|
| EP | 0 054 615 A1 | 6/1982 |
| EP | 0 094 493 A2 | 11/1983 |
| EP | 0 655 723 A1 | 5/1995 |
| GB | 1 445 414 | 8/1976 |
| GB | 2 342 738 B | 4/2000 |

OTHER PUBLICATIONS

Phillippow: Taschenbuch Der Elektrotechnik, Band 3, Teil 3, Bauelemente Und Bausteine Der Informationstechnik, p. 1126.

* cited by examiner

*Primary Examiner*—Jeffrey Gaffin
*Assistant Examiner*—Tammara Peyton
(74) *Attorney, Agent, or Firm*—Michael J. Striker

(57) ABSTRACT

The digital interface unit (1) for control of a peripheral device, especially for controlling a magnetic valve for an injection device, includes a plurality of output registers (2 to 5), which store and output a set of control variables applied to the input sides of the respective output registers in response to a control signal (18, MST E). So that the control variables are output from the output registers exactly simultaneously even though they are received sequentially, at least one group of buffer registers (12 to 15, 24 to 27) is connected to the output registers (2 to 5). The buffer register or registers provides intermediate storage for the control variables prior to output from the interface unit.

6 Claims, 3 Drawing Sheets

DIGITAL INTERFACE UNIT WITH SELECTIVE INPUT REGISTERS PROVIDING CONTROL VALUES TO OUTPUT REGISTERS THAT SIMULTANEOUSLY OUTPUT THE CONTROL VALUES WHEN ACTIVATED BY CONTROL LINE

BACKGROUND OF THE INVENTION

1. Field of the Invention

The present invention relates to a digital interface unit for control of a peripheral device and, more particularly, to a digital interface unit for control of a peripheral device, especially a positioning device, comprising a data input for receipt of a control value or values for the peripheral device, an output register or registers for storing the control value or values received via the data input and for preparation of the control value or values for output to the peripheral device, wherein the output register or registers has a first control input and means for outputting the control value or values in response to a signal at the first control input.

2. Prior Art

In microprocessor systems digital interface units are used for control of peripheral devices, which adapt the internal data bus of the microprocessor system to the external data bus between the microprocessor system and the peripheral device. An output circuit for a microprocessor system, for example, is known from Philippow, "Taschenbuch der Elektrotechnik" (Pocketbook of Electrical Engineering), 3rd Ed., Vol. 3, p. 1126. This output circuit has an output register, which receives a data word to be output via the internal data bus of the microprocessor system, prepares it and places it on the external data bus for the peripheral device. The control of the data output occurs by means of a control signal designated a data strobe signal, which controls the output register for importing the data word on the internal data bus, so that all data bits of the new data word appear at exactly the same time on the external data bus, which is important especially for controlling a positioning device, since otherwise the positioning device receives an incorrect control value for a short time.

It is however disadvantageous that the interface unit blocks the internal data bus of the microprocessor system during output of a new data word, since the new data word must be present on the internal data bus at exactly this time. Hardly any time exists for this. It is also not possible, for example, to already transfer the new data word to the interface unit prior to the provided time point and to employ the internal data bus subsequently for other purposes. Accordingly the usefulness of the internal data bus of the microprocessor system is limited.

In an interface unit with several output registers it is thus not possible to transmit a complete set of several new control values simultaneously to all output registers, since the individual output registers must be loaded sequentially over the internal data bus and the respective new control values immediately imported.

SUMMARY OF THE INVENTION

It is an object of the present invention to provide an interface unit for controlling a peripheral device which limits the usefulness of the internal data bus of the microprocessor system as little as possible and despite the output of a new data word guarantees that all data bits are output simultaneously so that incorrect control of the peripheral device is prevented. Especially the simultaneous output of a complete set of new control values should be possible with an interface unit according to the invention provided with several output registers.

This object, and others which will be made more apparent hereinafter, are attained in a digital interface unit for control of a peripheral device, especially a positioning device, comprising a data input for receipt of a control value for the peripheral device, an output register for storing the control value received at the data input and for preparation of the control value for output to the peripheral device, wherein the output register has a first control input and means for outputting the control value input to it on activation of or in response to a signal at the first control input.

According to the invention a buffer register is connected between the data input and the output register for intermediate storage of the control value applied to the control input of the output register.

The buffer register provides the advantage that a new data word can be received from the internal bus independently of the output of a data word from the unit, i.e. at any time.

The term "peripheral device" here means any electrically controllable component, device or adjusting member. The interface unit according to the invention is preferably used for control of magnetic valves in injection units.

In a preferred embodiment of the invention the interface unit has several parallel output registers, which control respective peripheral devices or contain respective control values for the same peripheral devices. During the control of the magnetic valve the individual output registers, for example can receive the electric current passing through the magnetic valve and control parameters for regulation of the magnetic valve. Each output register is connected to a respective buffer register. The input side of the buffer registers are connected with the address bus of the microprocessor system to allow selective addressing.

In another advantageous aspect of the invention transmission of individual data words from the microprocessor system to the interface unit does not occur individually at the predetermined time point, but a sequence of several data words is transmitted one after the other to the interface unit and intermediately stored there in a data memory. The internal data bus of the microprocessor system is rarely blocked, which is especially notable for control magnetic valves, since the sequence of control values is not varied during the closing process of the magnetic valve, so that the control values of a closing sequence can be transmitted without loss of function to the interface unit. After transmission of a sequence of control values to the interface unit, the individual controls values are then sequentially read out from the data memory and written into the output register.

The control of the sequential output of the intermediately stored control values to the output register occurs preferably via a control signal which is generated by the microprocessor system. The microprocessor system in this case of course has no further influence on the sequence and the control values of the intermediately stored sequence itself during the individual output, however the microprocessor system can still control the time of output. The control signal can be fed to the interface unit by a binary control line, whereby data and address buses of the microprocessor system advantageously remain free.

According to another aspect of the invention the interface unit has two operating modes. One of the operating modes allows a direct write of a new data word into the input side of the buffer memory, while a complete sequence of data words is transferred in another operating mode. In that mode a multiplexer is connected to a respective output register, which either directly connects the output register with a buffer memory or allows the storage of a complete sequence with intermediate switching of the data memory.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
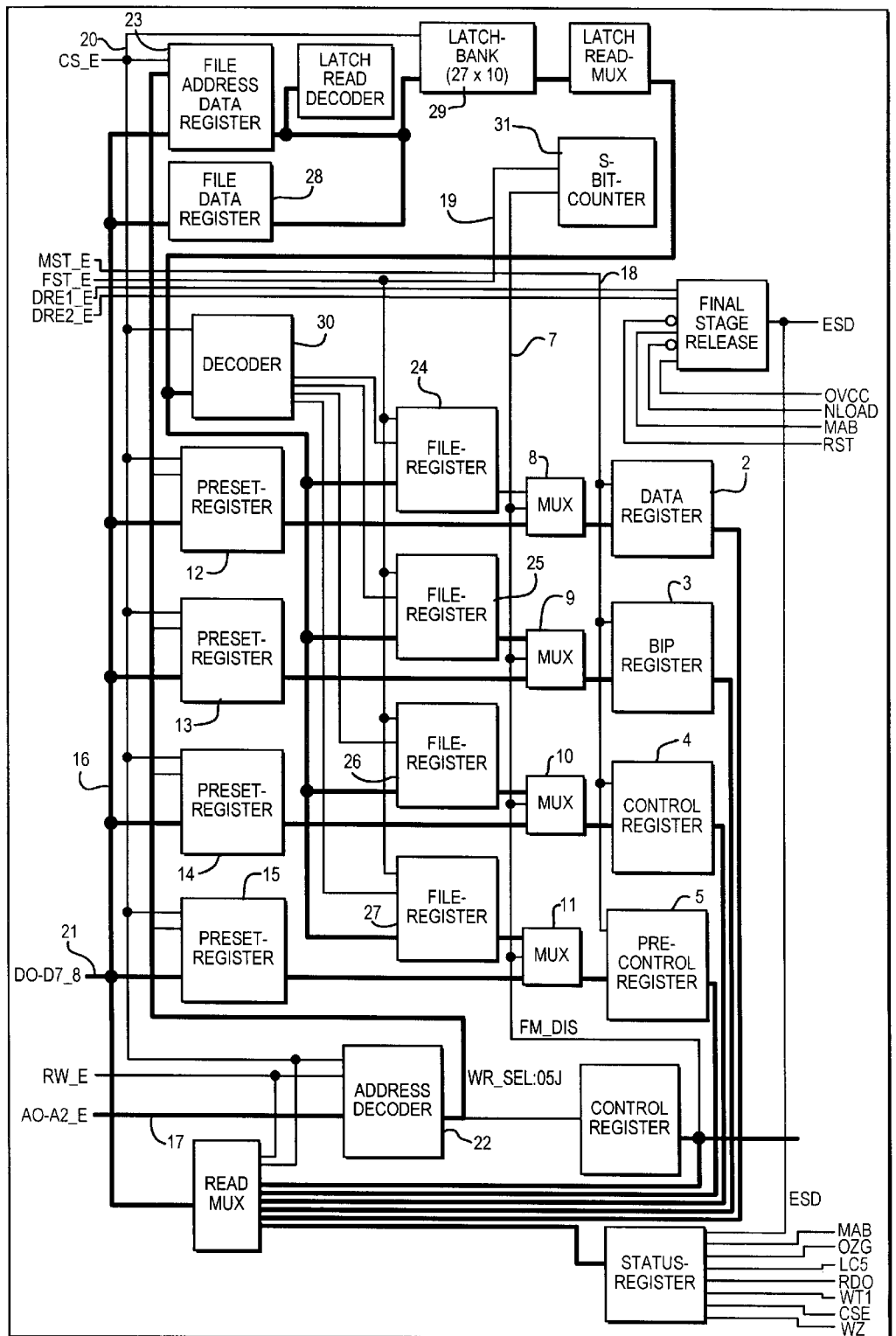
FIG. 1 is a block diagram of an interface unit according to the invention for control of a magnetic valve.

The digital interface unit 1 shown in FIG. 1 controls a magnetic valve and has four output registers 2, 3, 4 and 5 that determine the behavior of the magnetic valve. The data register 2 contains the actual control value for the current strength of the current through the magnetic valve. Control values are contained in the control register 4 and the pre-control register 5, which are required for the magnetic valve, especially for a P-controller. The BIP register 3 contains a control value, which is necessary for correct closing of the magnetic valve, especially for detection of a closed state of the magnetic valve.

Figure 3:
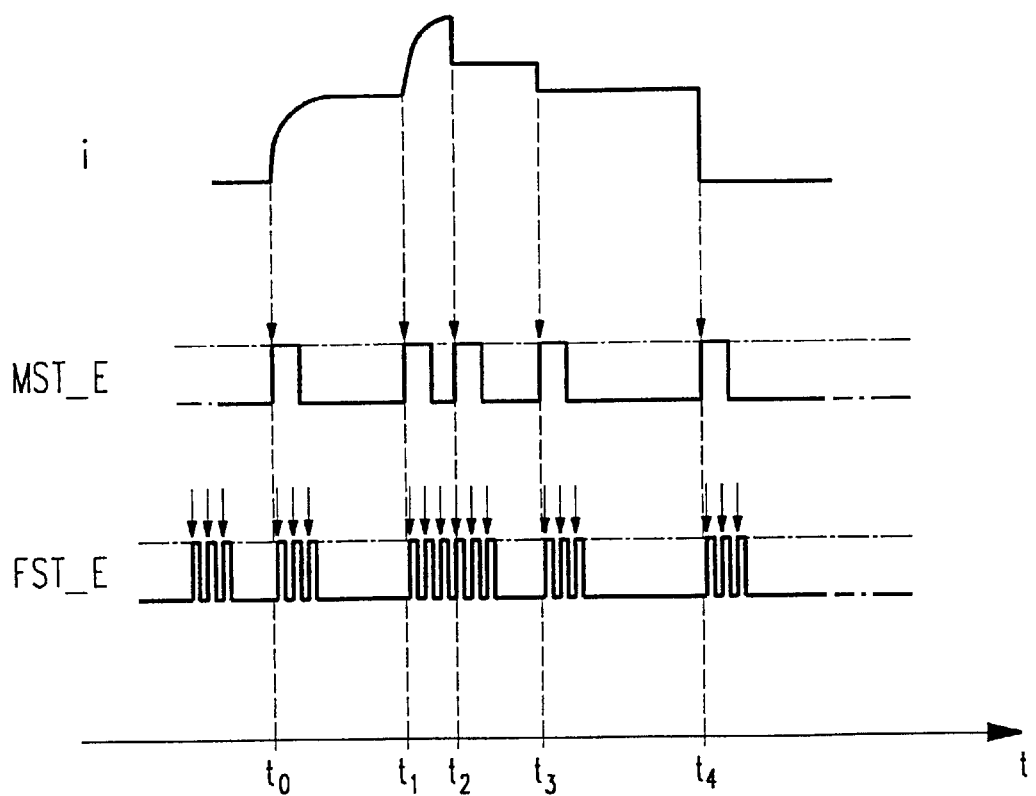
FIG. 3 is a graphical illustration of several control signals of the interface unit of FIG. 1 and of the electrical current through the magnetic valve in several stages of a closing opening process.

For clarification of the operation of the interface device 1 a closing process of the magnetic valve is described in the following with the aid of FIG. 3. The behavior of the electrical current i during the individual stages of the closing process is shown in FIG. 3 and described hereinbelow.

The closing process of the magnetic valve begins at the time point t0 with a so-called preliminary application of current to the magnetic valve which lasts until time point t1. During this preliminary application of current the electrical current i is increased in a controlled manner by a P controller, so that a control value must be contained in the data register 2, the pre-control register 5 and the control register 4 of the interface unit 1 during the preliminary application stage.

After that the magnetic valve is closed in the primary closing stage with a steep current increase, which lasts until the time point t2. Herein no regulation occurs.

Finally the electrical current i is reduced to a smaller value which remains constant from t2 to t3. In this state the shifting of the magnetic valve into its final configuration is detected. The pre-control register 5, the control register 4 and the BIP register 3 are relevant.

The electrical current i through the magnetic valve is reduced further to a still lower value in the next stage from t3 to t4, in order to save current, but of course the magnetic valve remains closed. The control register 4 and the pre-control register 5 are irrelevant in this stage.

The data register 2 of the interface unit 1 then contains the null control value at time point t4, so that the electrical current i through the magnetic valve drops to zero and the magnetic valve is opened again. The control register 4 and the pre-control register 5 are irrelevant for this.

From the previous description it is apparent that the contents of one or more output registers 2 to 5 must be changed during transition between the individual stages. During a change in the contents of the several registers it is important that the individual output registers 2 to 5 receive the new control values at exactly the same time, since a time-delayed change of an individual register contents could lead to an undesirable behavior of the magnetic valve. The change in the register contents thus does not occur by sequential writing of the new values to the individual output registers 2 to 5, but by an exactly simultaneous transmission of the new control values from a pre-switched memory structure, that functions as a buffer and can be loaded with the new control values prior to that sequentially. The transmission of the new control values into the output registers 2 to 5 is triggered by a microprocesor system 6 shown in FIG. 2, so that a control line (MST E, Magnetic valve Strobe Input) is connected with the registers.

The interface unit 1 shown in FIG. 1 has two different modes of operation, which either provide direct loading of the output registers 2 to 5 by the microprocessor system 6 or allow a buffering of several sets of control values. one after the other in the interface unit 1, which can define a complex current curve. The mode of operation of the interface unit 1 can be selected by means of a control line 7 (FM DIS).

The first operation mode subsequently described here provides a direct loading of the output registers 2 to 5 and is used essentially for test purposes, since the effect of the changed control values on the magnetic valve can be immediately observed.

In this mode of operation the input side of the output registers 2 to 5 is connected by means of respective multiplexers 8, 9, 10 and 11 with respective buffer registers(preset register) 12, 13, 14 and 15, which provide intermediate storage of the new control values prior to writing in the output registers 2 to 5. The outputs of the buffer registers 12 to 15 are switched to the multiplexers 8, 9, 10 and 11 by input of the control line 7.

The writing of the new control values into the buffer regions 12 to 15 occurs by means of the microprocessor system 6, which is connected with the interface unit 1 by means of a data bus 16, an address bus 17 and several control lines 18 to 21. First the microprocessor system 6 addresses the desired buffer register 12, 13, 14 or 15 by means of the address bus 17 and simultaneously puts the desired control value on the data bus 16. Moreover the control lines 20 (CS E, Chip Select Enable) and 21 (RW E, Read/Write Enable) are activated in order to control the interface unit 1 for preparation of the transmitted control values. The interface unit 1 decodes the address value on the address bus 17 using an address decoder 22 and controls one of the buffer registers 12 to 15 accordingly, in so far as the interface unit 1 is not found in another operating mode and accordingly addresses other registers. The buffer register 12, 13, 14 or 15 addressed in this manner receives the new control value from the data bus 16 and stores it. The new control values are written sequentially in this manner into the buffer registers 12 to 15. The individual buffer registers 12 to 15 can be separately accessed, which has the advantage that when only one control value is changed only one of the buffer registers 12, 13, 14 or 15 is newly written. Only one write/read process is required. The individual receipt of the new control values intermediately stored in the buffer registers 12 to 15 occurs simultaneously by all output registers 2 to 5, since the microprocessor system 6 activates the control line 18(MST E, Magnetic valve Strobe Input). The output registers 2 to 5 receive new control values from the buffer registers 12 to 15 at their inputs as is illustrated in FIG. 3.

In the following now the second mode of operation is described, in which several sets of control values one after the other are stored in the interface unit 1, which define a complex current curve, whereby transmission of control values from the microprocessor system 6 to the interface unit 1 is required only for initializing or activating the operating cycle of the magnetic valve, but not for each state change of the magnetic valve. The address bus 17 and the data bus 16 of the microprocessor system 6 thus remains free during normal operation and can be used for other purposes.

The activation of an operating cycle occurs by means of the microprocessor 6, since it addresses an address register 23 ("File Address Data Register") and transmits an address value by means of the data bus 16, which is subsequently used for addressing one of the four additional buffer registers 24 to 27 ("File Register"). Subsequently the microprocessor system 6 addresses a data register 28 ("File Data Register") and puts the new control value on the data bus 16. The new control value is written into the data register 28. Subsequently when the address value is stored in the address register 23 and the associated control value is written into the data memory 29, the several sets of control values can be received and thus define a complete operating cycle of the magnetic valve.

The retrieval of the operating cycle stored in the data memory 29 in the form of control values is controlled by the microprocessor system 6, when the control line 19 (FST E, File Strobe Enable) activates it. A decoder 30 decodes an address value stored in the data memory 29 during each activation of the control line 19 (FST E) and activates the associated buffer register 24, 25, 26 or 27, which takes the associated control values from the data memory 29. In this way a complete set of control values is read out from the data memory 29 and into the registers 24 to 27. Prior to the retrieval of the new control values from the data memory 29 a 5-bit counter 31 is reset (e.g. by setting of a bit in one of the registers (FM DIS)). Subsequently the counter 31 is incremented on each activation of the control line 19 (FST E). The control line 7 (FM DIS) controls the multiplexers 8 to 11 to connect the buffer registers 24 to 27 with the output registers 2 to 5. The receipt of the new control values in the output registers 2 to 5 occurs as in the first operating mode, since the microprocessor system 6 activates the control line 18 (MST E) connected with the output registers 2 to 5. The output registers 2 to-5 receive the new control values exactly at the same time from the connected buffer registers 24 to 27. Preferably in this operating mode the fact is that several sets of control values can be stored in the data memory 29, for example which control the operating cycle of the magnetic valve shown in FIG. 3. During normal operation no transfer of new control values from the microprocessor 6 to the interface unit 1 is required.

Figure 2:
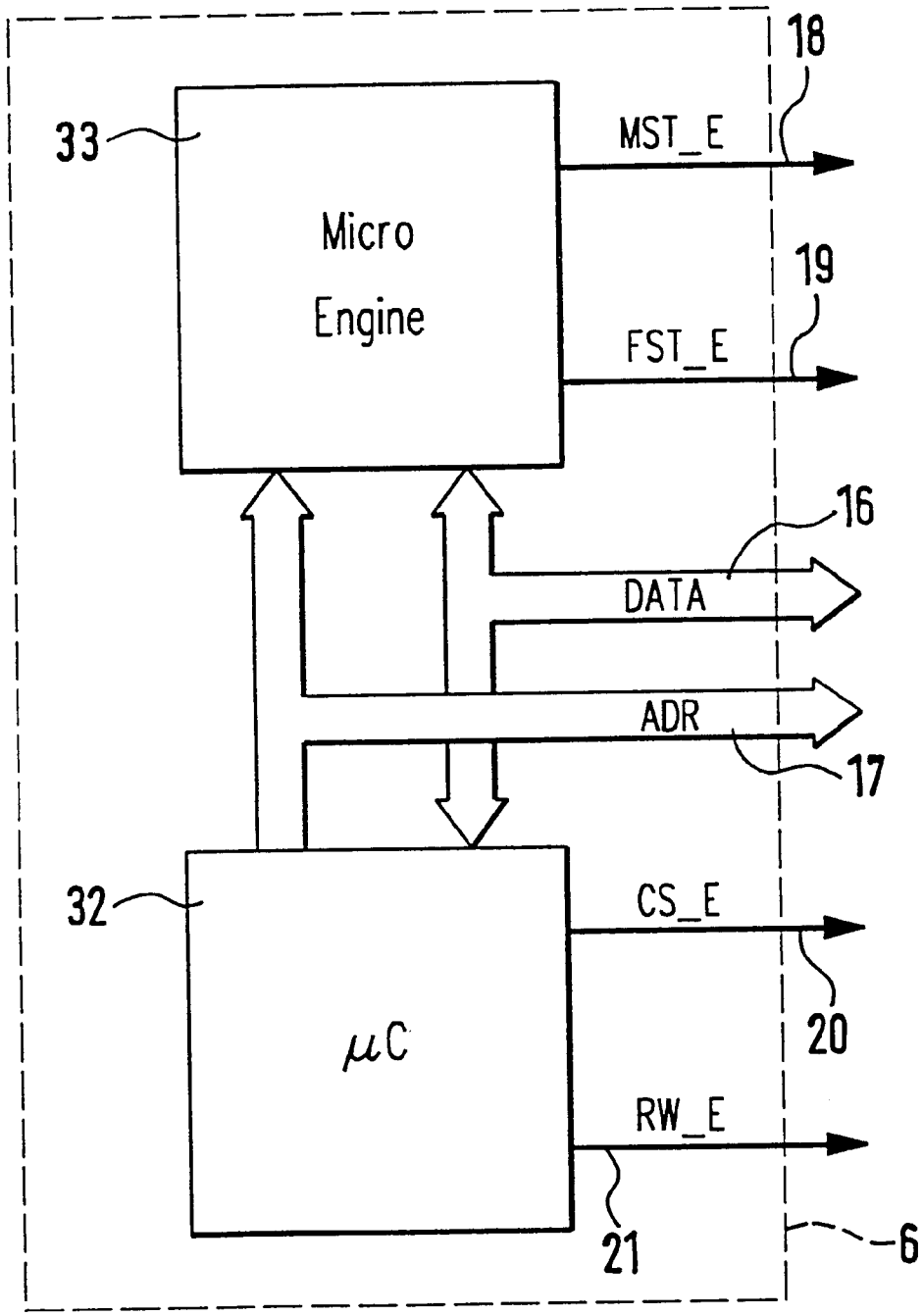
FIG. 2 is a block diagram of a microprocessor system for controlling the interface unit of FIG. 1.

FIG. 2 shows an advantageous embodiment of the microprocessor system 6 for control of the interface unit 1. The microprocessor system 6 has a commercial microprocessor 32 acting as core component, which is shown here only schematically and communicates with the interface unit 1 via the address bus 17 and the data bus 16. The microprocessor 32 has the purpose in the scope of the present invention to transmit the control values of a complete operating cycle of the magnetic valve into the data memory 29 of the interface unit 1. Subsequently the microcomputer 32 has no further control over the activation of the opening and closing of the magnetic valve.

The microprocessor system 6 furthermore has a so-called microprocessor engine 33 embodied as a simple computer, which operates the control line 18 and the control line 19 and thus controls reading of the intermediately stored control values from the data memory 29 to the buffer registers 24 to 27 and also the receipt of the control values in the output registers 2 to 5 from the buffer registers 24 to 27 or 12 to 15. The microcomputer 32 however has the ability to transfer commands to the micro engine 33 via the data bus 16, so that it control subsequently the interface unit 1.

The disclosure in German Patent Application 198 30 625.3 of Jul. 9, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in an improved digital interface unit, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A digital interface unit for activating a peripheral device, said digital interface unit having an input side and an output side and comprising data input means (16) for receiving control values for controlling the peripheral device;

a plurality of output registers (2 to 5) for storing the control values received via the data input means (16) and for providing the control values simultaneously to the peripheral device on said output side in order to activate the peripheral device, said output registers having respective control inputs each connected with a first control line (MST E) whereby said control values present on said input side are simultaneously stored in said output registers when said control inputs of said output registers are activated by a control signal on said first control line (MST E);

respective buffer registers (12 to 15) connected between said data input means (16) and corresponding output registers (2 to 5) for temporarily storing said control values prior to providing said control values simultaneously to said output registers; and a bus connected to said respective buffer registers (12 to 15) on said input side for selective addressing of said respective buffer registers.

2. The digital interface unit as defined in claim 1, wherein said bus is an address bus (17).

3. The digital interface unit as defined in claim 1, further comprising a data memory (29) and additional buffer registers (24 to 27) for said control values and wherein said data memory is connected upstream to said additional buffer registers (24 to 27) and said data memory comprises means for temporarily storing sets of said control values.

4. The digital interface unit as defined in claim 3, further comprising second control line (19, FST E) and wherein said additional buffer registers (24 to 27) have respective control inputs connected to said second control line, whereby respective temporarily stored sets of said control values are received in said additional buffer registers (24 to 27), one set after the other, from said data memory when said control inputs of said additional buffer registers are activated in response to a control signal on said second control line.

5. The digital interface unit as defined in claim 4, further comprising respective multiplexers (8 to 11) connected upstream to said corresponding output registers (2 to 5) and wherein each of said multiplexers have two multiplexer inputs, one of said multiplexer inputs being connected to said buffer registers (12 to 15) to receive latest ones of said control values received in said data input means (16) on said input side and another of said multiplexer inputs being connected to said data memory (29) via said additional buffer registers (24 to 27) to read out temporarily stored sets of said control values sequentially, one set after the other, and to sequentially transfer said temporarily stored sets, one set after the other, to said output registers so that said control values of each of said temporarily stored sets are simultaneously input to said output registers to control said peripheral device during said sequential transfer of said temporarily stored sets without providing additional control signals on said second control line.

6. The digital interface unit as defined in claim 3, or 4 wherein said data memory is a latch bank (29) containing addresses and data associated with said addresses.

* * * * *